US010013339B2

(12) United States Patent
Athinathan (10) Patent No.: US 10,013,339 B2
(45) Date of Patent: Jul. 3, 2018

(54) SYSTEM AND METHOD FOR AUTOMATING TESTING WITHOUT SCRIPTING (71) Applicant: Cognizant Technology Solutions India Pvt. Ltd., Chennai (IN)

(72) Inventor: Suganthakumar Athinathan, Coimbatore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 74 days.

(21) Appl. No.: 15/094,667

(22) Filed: Apr. 8, 2016

(65) Prior Publication Data

US 2017/0192879 A1 Jul. 6, 2017

(30) Foreign Application Priority Data

Dec. 30, 2015 (IN) .......................... 7067/CHE/2015

(51) Int. Cl.
| | | |
|---|---|---|
| *G06F 11/00* | (2006.01) | |
| *G06F 11/36* | (2006.01) | |
| *H04L 29/08* | (2006.01) | |
| *H04L 12/58* | (2006.01) | |
| *G06F 11/34* | (2006.01) | |

(52) U.S. Cl.
CPC ...... *G06F 11/3668* (2013.01); *G06F 11/3414* (2013.01); *H04L 51/046* (2013.01); *H04L 67/02* (2013.01)

(58) Field of Classification Search
CPC .. G06F 11/3668; G06F 11/3414; G06F 11/26; G06F 11/263; G06F 11/2635; G06F 11/3672; G06F 11/3684; H04L 51/046; H04L 67/02

USPC ............................ 714/39, 25, 33, 37, 46, 57
See application file for complete search history.

(56) References Cited

U.S. PATENT DOCUMENTS

| | | |
|---|---|---|
| 6,587,969 B1 | 7/2003 | Wienberg |
| 7,480,602 B2 | 1/2009 | Duffie |
| 2008/0127095 A1 | 5/2008 | Brennan |
| 2013/0219227 A1* | 8/2013 | Augustine ........... G06F 11/3688 714/38.1 |
| 2014/0032637 A1* | 1/2014 | Weir .................. G01R 31/2834 709/203 |
| 2014/0201612 A1 | 7/2014 | Buttner |

(Continued)

*Primary Examiner* — Joseph D Manoskey
(74) *Attorney, Agent, or Firm* — Cantor Colburn LLP (57) ABSTRACT

A system and computer-implemented method for automating end-to end testing is provided. The system comprises a connection settings module to receive information for connecting with one or more external systems. The system further comprises a test setup module to create test workflows, wherein creating the test workflows comprise selecting one or more pre-stored source files and corresponding one or more pre-stored target files and mapping input and output of each of the one or more selected pre-stored source files with the corresponding one or more selected pre-stored target files for testing additional source files associated with the one or more external systems. Furthermore, the system comprises a workflow execution module to connect with the one or more external systems using the received information to retrieve the additional source files and execute the created test workflows corresponding to the retrieved one or more additional source files.

20 Claims, 5 Drawing Sheets (56) References Cited

U.S. PATENT DOCUMENTS

2014/0310231 A1* 10/2014 Sampathkumaran ...................... G06F 17/30563 707/602
2015/0007149 A1 1/2015 Maddela
2015/0143064 A1* 5/2015 Bhargava ............ G06F 11/1451 711/162
2016/0004622 A1* 1/2016 Kaulgud ............. G06F 11/3684 717/132
2016/0314062 A1* 10/2016 Pedro de Castro . G06F 11/3664

* cited by examiner

SYSTEM AND METHOD FOR AUTOMATING TESTING WITHOUT SCRIPTING

CROSS REFERENCE TO RELATED APPLICATION

This application is related to and claims the benefit of Indian Patent Application No. 7067/CHE/2015 filed on Dec. 30, 2015, the contents of which are herein incorporated by reference in their entirety.

FIELD OF THE INVENTION

The present invention relates generally to software testing. More particularly, the present invention provides a system and method for automating end-to-end testing without scripting.

BACKGROUND OF THE INVENTION

Testing is an important part of any Software Development Lifecycle (SDLC). Usually, various types of testing exists based on the software entity that has to be tested. Types of testing include unit testing, functional testing, non-functional testing, integration testing, compatibility testing, regression testing, performance testing and the likes.

Conventionally, various systems and methods exist for automating testing. For example, automation tools exist for testing databases, web services, database tables, database Application Program Interface (API), flat file data and format, Extensible Markup Language (XML) data and schema, X12 files, Transmission Control Protocol/Internet Protocol (TCP/IP) socket service testing and Hypertext Transfer Protocol (HTTP) post requests. However, these test automation tools require scripting in specific programming languages. Further, the test automation tools do not support all of the above-mentioned testing activities. Furthermore, most of the above-mentioned testing activities require repetitive and prerequisite tasks associated with testing such as building a test file, uploading/downloading the files through File Transfer Protocol (FTP) and executing batch jobs. The existing test automation tools do not support these tasks without additional scripting from testers. In addition, scripts developed for a particular test automation tool cannot be reused for other test automation tools having different architecture. Also, existing functional testing tools do not support performance testing based on load criteria. Likewise, performance testing tools do not support functional validations on diverse platforms.

In light of the abovementioned disadvantages, there is a need for a system and method for automating end-to-end testing without scripting. Further, there is a need for a system and method that supports various types of testing for multiple external systems. Furthermore, there is a need for a system and method which is customizable and capable of connecting with multiple platforms concurrently. In addition, there is a need for a system and method that facilitates reusing existing test setups for future testing activities.

SUMMARY OF THE INVENTION

A system, computer-implemented method and computer program product for automating end-to end testing is provided. The system comprises a connection settings module configured to receive information for connecting with one or more external systems. The system further comprises a test setup module configured to create one or more test workflows, wherein creating the one or more test workflows comprise selecting one or more pre-stored source files and corresponding one or more pre-stored target files and mapping input and output of each of the one or more selected pre-stored source files with the corresponding one or more selected pre-stored target files for testing additional one or more source files associated with the one or more external systems. Furthermore, the system comprises a workflow execution module configured to connect with the one or more external systems using the received information to retrieve the one or more additional source files and execute the one or more created test workflows corresponding to the retrieved one or more additional source files, wherein executing the one or more created workflows comprise comparing the retrieved additional one or more source files with the corresponding one or more mapped pre-stored target files to generate test execution results.

In an embodiment of the present invention, the one or more external systems comprise one or more databases, one or more test management tools, one or more servers and components of the one or more external systems. In an embodiment of the present invention, the components of the one or more external systems comprise one or more flat files, Extensible Markup Language (XML) data, spreadsheets, web services, one or more Transmission Control Protocol (TCP)/Internet Protocol (IP) sockets requests, X12 files, Hypertext Transfer Protocol (HTTP) post messages and database Application Program Interfaces (APIs).

In an embodiment of the present invention, the information for connecting with the one or more external systems comprise authentication details and connection settings. In an embodiment of the present invention, the information for connecting with the one or more external systems is received from one or more users. In an embodiment of the present invention, the step of creating the one or more test workflows further comprise selecting a location for saving the test execution results.

In an embodiment of the present invention, the system further comprises a reporting module configured to automatically send the test execution results on one or more electronic communication devices via one or more communication channels. In an embodiment of the present invention, the one or more communication channels comprise electronic mail, Short Messaging Service (SMS), instant messaging application and web service. In an embodiment of the present invention, the test execution results are in the form of reports and graphical forms comprising charts, diagrams and graphs.

The computer-implemented method for automating end-to-end testing, via program instructions stored in a memory and executed by a processor, comprises receiving information for connecting with one or more external systems. The computer-implemented method further comprises creating one or more test workflows, wherein creating the one or more test workflows comprise selecting one or more pre-stored source files and corresponding one or more pre-stored target files and mapping input and output of each of the one or more selected pre-stored source files with the corresponding one or more selected pre-stored target files for testing additional one or more source files associated with the one or more external systems. Furthermore, the computer-implemented method comprises connecting with the one or more external systems using the received information to retrieve the one or more additional source files. Also, the computer-implemented method comprises executing the one or more created test workflows corresponding to the retrieved one or more additional source files, wherein executing the one or more created workflows comprise comparing the retrieved additional one or more source files with the corresponding one or more mapped pre-stored target files to generate test execution results.

The computer program product for automating end-to-end testing comprises a non-transitory computer-readable medium having computer-readable program code stored thereon, the computer-readable program code comprising instructions that when executed by a processor, cause the processor to receive information for connecting with one or more external systems. The processor further creates one or more test workflows, wherein creating the one or more test workflows comprise selecting one or more pre-stored source files and corresponding one or more pre-stored target files and mapping input and output of each of the one or more selected pre-stored source files with the corresponding one or more selected pre-stored target files for testing additional one or more source files associated with the one or more external systems. Furthermore, the processor connects with the one or more external systems using the received information to retrieve the one or more additional source files. In addition, the processor executes the one or more created test workflows corresponding to the retrieved one or more additional source files, wherein executing the one or more created workflows comprise comparing the retrieved additional one or more source files with the corresponding one or more mapped pre-stored target files to generate test execution results.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for automating end-to-end testing without scripting is described herein. The invention provides for a system and method that supports various types of testing for multiple external systems. The invention further provides for a system and method which is customizable and capable of connecting with multiple platforms concurrently. Furthermore, the invention provides for a system and method that facilitates reusing existing test setups for future testing activities.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
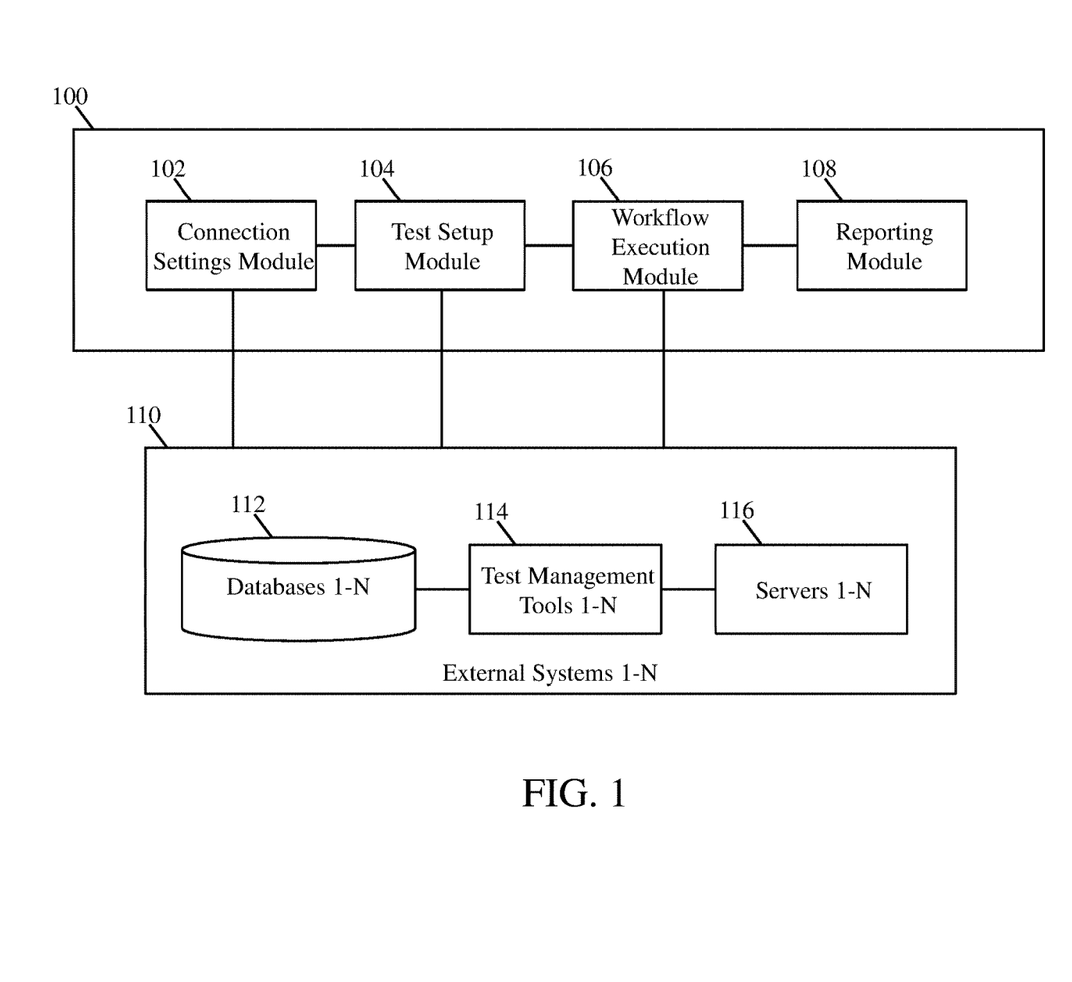
FIG. 1 is a block diagram illustrating a system for automating end-to-end testing without scripting, in accordance with an embodiment of the present invention.

FIG. 1 is a block diagram illustrating a system for automating end-to-end testing without scripting, in accordance with an embodiment of the present invention. The system 100 comprises a connection settings module 102, a test setup module 104, a workflow execution module 106 and a reporting module 108.

The connection settings module 102 is configured to receive information for connecting to one or more external systems 110. Further, the received information for connecting to the one or more external systems 110 comprise, but not limited to, authentication details and connection settings. Furthermore, the received information facilitates connection with the one or more external systems to enable testing of the one or more external systems 110 or one or more components of the one or more external systems 110. In an embodiment of the present invention, the one or more external systems 110 and/or components of the one or more external systems 110 to be tested include, but not limited to, databases 112, test management tools 114, servers 116, flat files, Extensible Markup Language (XML) data, spreadsheets, web services, Transmission Control Protocol (TCP)/Internet Protocol (IP) sockets requests, X12 files, Hypertext Transfer Protocol (HTTP) post messages and database Application Program Interfaces (APIs).

In an embodiment of the present invention, the received information is provided by one or more users. The one or more users include, but not limited to, testers and quality analysts. In an embodiment of the present invention, the one or more users access the system 100 via one or more electronic communication devices communicating with the system 100 via internet. In another embodiment of the present invention, the system 100 can be accessed by downloading an application on the one or more electronic communication devices. In yet another embodiment of the present invention, the system 100 is configured as an appstore platform comprising an appstore server. Further, the appstore provides one or more applications for different types of testing on one or more client devices. Furthermore, the one or more applications can be downloaded via the appstore and installed on the one or more client devices. In yet another embodiment of the present invention, the system 100 is an apparatus/machine comprising a user interface configured to facilitate the one or more users to interact with the system 100. In yet another embodiment of the present invention, the system 100 has a distributed automation model comprising a master-slave setup. Further, the master is configured to schedule and allocate execution tasks to slaves based on their availability and state.

In an embodiment of the present invention, the received information for connecting to the one or more external systems 110 is encrypted and stored as part of a user's profile. Further, the system 100 facilitates creating one or more user profiles. In an embodiment of the present invention, a user profile can be accessed via multiple electronic communication devices simultaneously.

Once the information to connect with the one or more external systems 110 is received, the one or more users access the test setup module 104. The test setup module 104 is configured to provide one or more options to the one or more users to create and save one or more test workflows for testing the one or more external systems 110. Further, the one or more test workflows comprise a sequence of test steps used for accomplishing end-to-end testing. Furthermore, each test step is configured to perform a test. In addition, each test step can orchestrate data to other test steps. Also, test step execution order can be dynamically controlled based on runtime results of previous test steps of the one or more workflows. In an embodiment of the present invention, one or more test steps include various operations such as, but not limited to, File Transfer Protocol (FTP) upload and download, run windows/Unix commands, run test management tool scripts, upload test results, build Sequential Query Language (SQL) scripts and create test data files in different formats.

In an embodiment of the present invention, the one or more users create the one or more test workflows by selecting one or more pre-stored source files and corresponding one or more pre-stored target files. The one or more pre-stored source files are associated with, but not limited to, databases 112, test management tools 114, servers 116, flat files, Extensible Markup Language (XML) data, spreadsheets, web services, Transmission Control Protocol (TCP)/Internet Protocol (IP) sockets requests, X12 files, Hypertext Transfer Protocol (HTTP) post messages and database Application Program Interfaces (APIs). In an embodiment of the present invention, the one or more pre-stored target files are one or more sample files used for comparison with the one or more source files during testing. In an embodiment of the present invention, the one or more target files are in the form of one or more spreadsheets.

After selecting the one or more pre-stored source and the one or more corresponding pre-stored target files, the one or more users map input and output of the one or more pre-stored source files with the one or more pre-stored target files to facilitate comparison during execution of the one or more test workflows for testing additional one or more source files. In an embodiment of the present invention, input mapping and output mapping comprise linking each of the pre-stored source and corresponding target files by matching criteria and expected values. Further, mapping the pre-stored source file with the pre-stored target file facilitates in testing the additional one or more source files during testing, using the saved user mappings, without scripting. Once mapping is completed, the one or more users select location for saving execution results to complete the process of creating the one or more test workflows.

Once the one or more test workflows are created, these are saved in the test setup module 104. In an embodiment of the present invention, the one or more created test workflows are saved as one or more project files in the test setup module 104 for future testing projects. In an embodiment of the present invention, the one or more created project files can be shared with other testers via one or more communication channels.

In an embodiment of the present invention, the system 100 provides one or more test setup modules 104 for different types of testing and creating corresponding one or more test workflows. In an embodiment of the present invention, the one or more test setup modules 104 are provided as one or more applications. Further, the one or more applications are downloadable as and when required on the one or more electronic communication devices. Furthermore, each of the one or more test setup modules 104 have corresponding workflow execution module 106 to facilitate execution of the created one or more test workflows.

The workflow execution module 106 is configured to connect with the one or more external systems 110 using the received information. The workflow execution module 106 is further configured to retrieve the one or more additional source files associated with the one or more connected external systems. The workflow execution module 106 is further configured to execute the one or more saved test workflows corresponding to the one or more additional source files.

Figure 2:
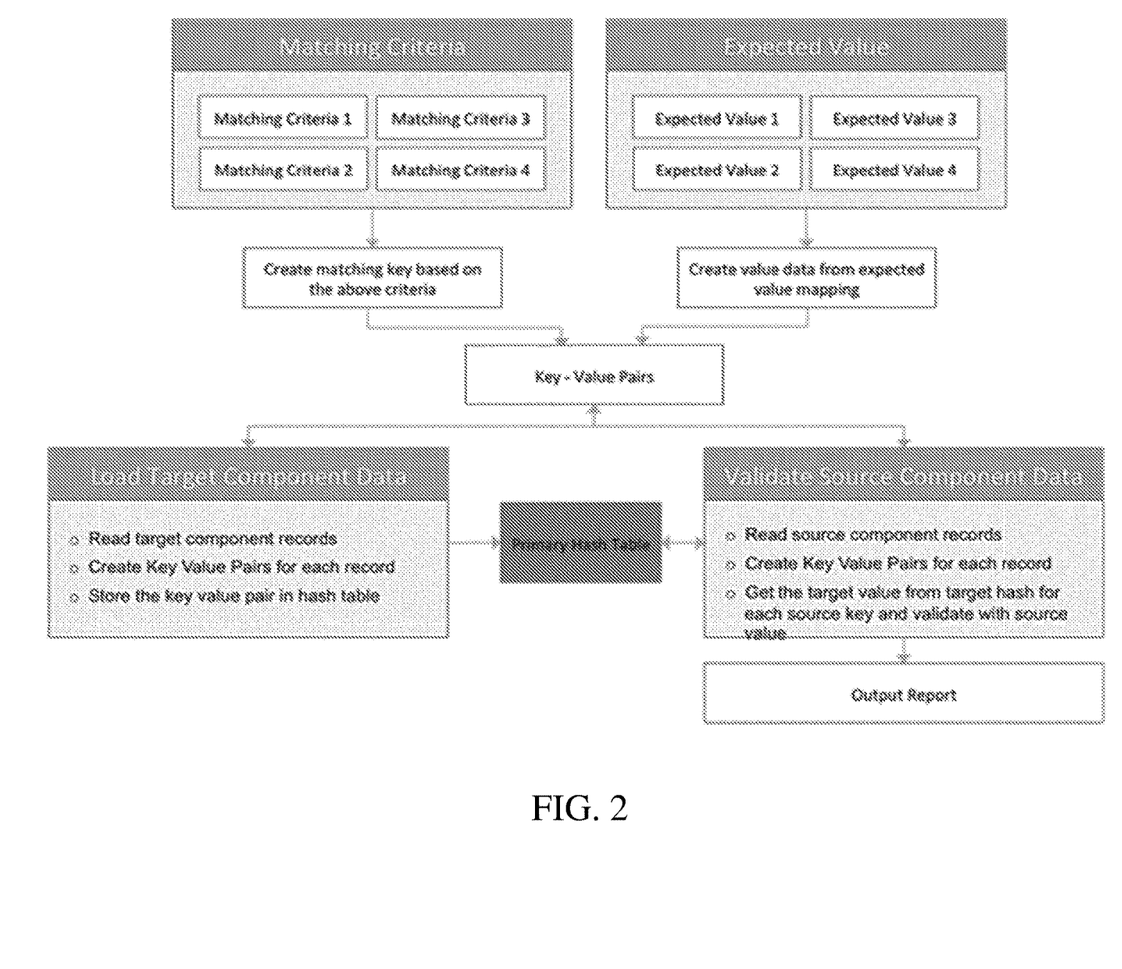
FIG. 2 is a flowchart depicting creation of the one or more key-value pairs and validation of source files, in accordance with an embodiment of the present invention.

During test workflow execution, the workflow execution module 106 loads the user mappings from the test setup module 104. The workflow execution module 106 then reads the pre-stored mapped target file corresponding to the source file to be tested and creates one or more key-value pairs. The key-value pairs comprise a key based on a matching criteria and corresponding expected value for each of the one or more records of the pre-stored mapped target file. In an embodiment of the present invention, the one or more key-value pairs are stored in a primary hash table. The workflow execution module 106 then reads each record of the source file and creates a key-value pair for each record of the source file. The workflow execution module 106 further checks for the key for each record of the source file in the primary hash table. In case the key for a record of the source file exists in the primary hash table, the workflow execution module 106 retrieves the corresponding value from the primary hash table and compares the retrieved value with the source value. If the source value is same as the target value then the test is considered as "PASS". The results of the test workflow execution are forwarded to the reporting module 108. FIG. 2 is a flowchart depicting creation of the one or more key-value pairs and validation of source files, in accordance with an embodiment of the present invention.

In an embodiment of the present invention, the workflow execution module 106 comprises a split search algorithm configured to load and compare the additional source file to be tested with corresponding pre-stored mapped target file. In an embodiment of the present invention, the split search algorithm splits the first pre-stored mapped target file into multiple smaller segments. Further, records in each segment are loaded to the primary hash table as one or more key-value pairs. Furthermore, records in the additional source file are compared with the first segment loaded in the primary hash table. If a record in the source file matches with a record in the primary hash table, then the corresponding value in the source file is compared with value associated with the matching record in the primary hash table. In an embodiment of the present invention, if the value in the source file does not match the value associated with the matching record in the primary hash table, the record in the source file is saved in a separate mismatch file. In an embodiment of the present invention, if the record does not exist in the primary hash table then the record is saved as a separate pending records file and compared against other segments of the first pre-stored mapped target file until all the records in the source file are compared and any records pending after comparing with last segment are saved in a missing record file. Once all the test steps of the test workflow are completed, the control is transferred to the reporting module 108. In an embodiment of the present invention, the split search algorithm facilitates in increasing efficiency as it requires less memory and time. Further, the split search algorithm provides a record-by-record detailed report for analysis to the one or more users.

The reporting module 108 is configured to receive the execution results related to the one or more executed test workflows from the workflow execution module 106. The reporting module 108 is further configured to provide the execution results to the one or more users in a more meaningful manner such as, but not limited to, reports and graphical forms including charts, diagrams and graphs. In an embodiment of the present invention, the execution results are provided in the form of a spreadsheet. In an embodiment of the present invention, the reporting module 108 comprise one or more communication channels interface (not shown) that facilitate in automatically sending the execution results to the one or more users via one or more communication channels. In an embodiment of the present invention, the one or more communication channels include, but not limited to, electronic mail, Short Messaging Service (SMS), instant messaging application and web service.

In an embodiment of the present invention, the system 100 connects with the one or more external systems 110 and executes complex validations. Further, the system 100 is capable of validating one or more databases such as, but not limited to, SQL server, Oracle and Sybase concurrently. Furthermore, the system 100 is customizable for any architecture, easy to use and reusable. In addition, the system 100 is capable of testing database stored procedures and measuring response time of database APIs along with functional validations. In an embodiment of the present invention, the system 100 connects with the one or more databases. The system 100 then executes SQL queries provided by the one or more users or builds the required SQL queries using input parameters from user's test cases and retrieves the data as data sets. Then the data present in the output data sets are validated based on user's matching criteria and expected value mappings.

In another embodiment of the present invention, the system 100 is capable of testing functionality of web services. The system 100 provides one or more options to the one or more users to configure and test multiple web services concurrently. Further, the web service request messages are created based on one or more sample templates provided by the one or more users. The created web service request messages are then automatically sent and validated. Further, the system 100 imports data from the received web service response and verifies the response by comparing with target files containing expected results. Furthermore, the system 100 provides options to the one or more users to perform load testing of web services in multiple threads with same functional test workflow. In addition, the system 100 provides reusable configuration and modifiable test workflows for agile applications. In another embodiment of the present invention, the system 100 facilitates testing web applications.

In yet another embodiment of the present invention, the system 100 facilitates creating flat files in user-defined format using pre-stored data from spreadsheets along with test data. Further, the created flat files comprise fixed width and delimited files. Furthermore, the created flat files are used as mock-up test files. In yet another embodiment of the present invention, the system 100 validates flat files of various formats. The flat files are validated by importing field mappings from column headings present in the flat files. In an embodiment of the present invention, the system 100 reads flat file data based on the matching criteria and expected value mappings provided by the user. Further, data read from the flat file is stored as key value pairs and validated against each column of each row from the one or target files pre-stored as spreadsheets. In another embodiment of the present invention, the system 100 facilitates checking format of the flat files based on one or more user-defined rules.

Figure 3:
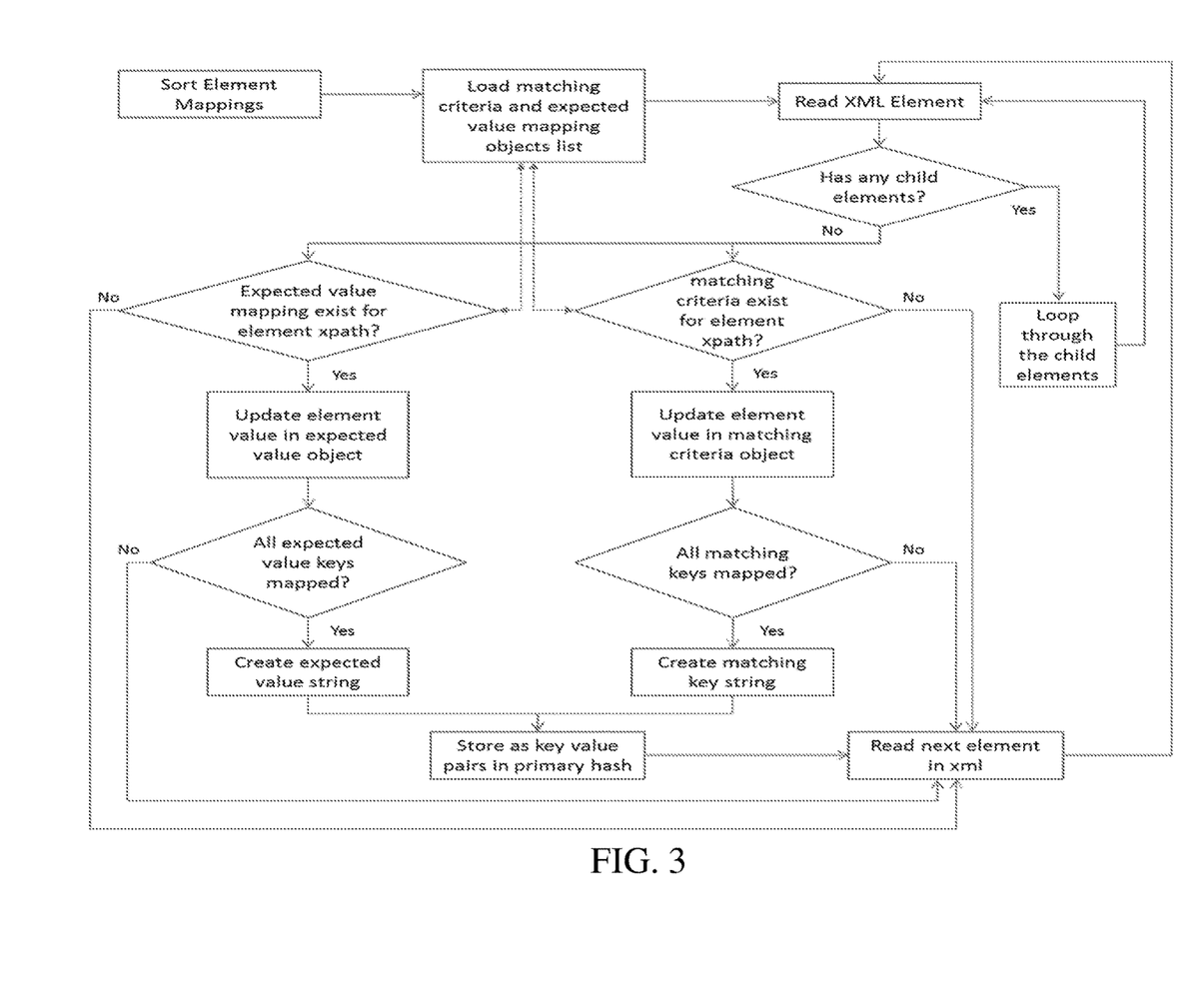
FIG. 3 is a flowchart depicting Extensible Markup Language data mapping algorithm, in accordance with an embodiment of the present invention.

In yet another embodiment of the present invention, the XML data such as, but not limited to, element names, values and attribute values is validated using pre-stored XML data. Further, XML schema is verified using XML Schema Definition (XSD) to detect XML structural errors. In an embodiment of the present invention, the system 100 comprise an XML data mapping algorithm configured to read and map XML data with source files for validation. The XML data mapping algorithm stores matching criteria object and expected value object for each element of the XML data as key-value pairs in the primary hash table. The XML data mapping algorithm then compares the stored key-value pairs with the XML data of the source files for testing. FIG. 3 is a flowchart depicting XML data mapping algorithm, in accordance with an embodiment of the present invention.

In yet another embodiment of the present invention, the system 100 provides options to the one or more users via the connections settings module 102 to configure the one or more test workflows for functional and performance testing of one or more TCP/IP sockets. In an exemplary embodiment of the present invention, the system 100 facilitates sending TCP/IP socket requests to a host server and verifies the response by comparing with expected results/values stored in a target file. In an embodiment of the present invention, the same test workflow may be used for testing multiple TCP/IP sockets in the same test run. Furthermore, the system 100 permits batch validations to facilitate testing multiple TCP/IP sockets efficiently.

In yet another embodiment of the present invention, the system 100 compares one or more X12 files having various formats and efficiently provides comparison results. Further, the system 100 validates the one or more X12 files using input and output mappings provided by the one or more users and/or data retrieved from, but not limited to, the one or more external systems 110 such as the one or more databases 112, web services and flat files. In yet another embodiment of the present invention, the system 100 is capable of file-to-file comparison for various file types including, but not limited to, flat files, spreadsheets and XML files.

In yet another embodiment of the present invention, the system 100 facilitates in executing Unix commands on remote servers. Further, the system 100 integrates with other test workflows for end-to-end integration testing. Furthermore, the system 100 allows capturing shell command output for further validations and executes shell scripts and sequential commands. In yet another embodiment of the present invention, the system 100 executes Database commands such as Data Definition Language (DDL) and Data Manipulation Language (DML) commands. In yet another embodiment of the present invention, the system 100 uploads the test execution results to the one or more test management tools 114 thereby automatically maintaining test execution log and automating defect logging. In yet another embodiment of the present invention, the system 100 provides options to the one or more users to schedule execution of test scripts associated with the one or more test management tools and receive notifications related to execution. Further, automating scripts execution, database validations and web service validations facilitates in completely automating regression testing. In yet another embodiment of the present invention, the system 100 facilitates PuTTY integration to enable port forwarding through gateways. Further, the system 100 facilitates managing port forwarding sessions.

In yet another embodiment of the present invention, the system 100 is capable of using messages from queues and perform validations. The messages include, but not limited to, Java Message Service (JMS) messages and messages in Microsoft Message Queue (MSMQ).

In an embodiment of the present invention, the system 100 facilitates data reconciliation, provides continuous integration solution to upload and download files/reports and facilitates scheduling repetitive tasks such as, but not limited to, executing scripts and moving files. The system 100 further comprises a keyword driven framework for integration with the one or more test automation tools.

Figure 4:
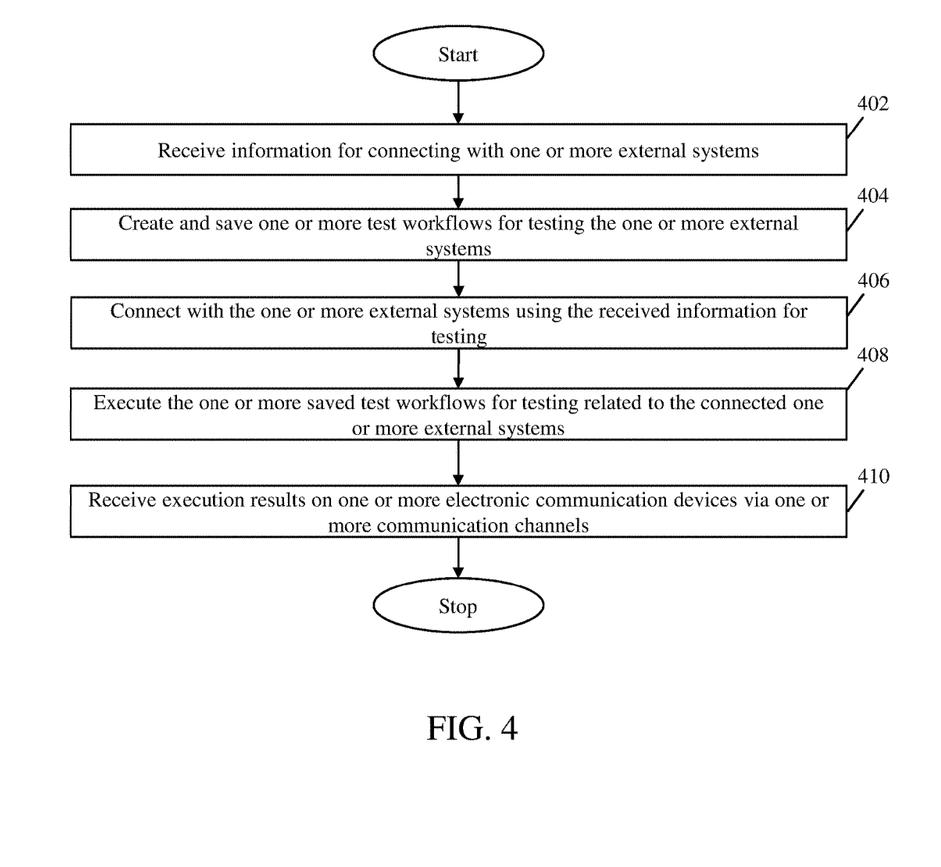
FIG. 4 is a flowchart illustrating a method for automating end-to-end testing without scripting, in accordance with an embodiment of the present invention.

FIG. 4 is a flowchart illustrating a method for automating end-to-end testing without scripting, in accordance with an embodiment of the present invention.

At step 402, information for connecting with one or more external systems is received. Further, the received information for connecting to the one or more external systems includes, but not limited to, authentication details and connection settings. Furthermore, the received information is required to facilitate testing of the one or more external systems or one or more components of the one or more external systems. In an embodiment of the present invention, the one or more external systems and/or components of the one or more external systems to be tested include, but not limited to, databases, test management tools, servers, flat files, Extensible Markup Language (XML) data, spreadsheets, web services, Transmission Control Protocol (TCP)/Internet Protocol (IP) sockets requests, X12 files, Hypertext Transfer Protocol (HTTP) post messages and database Application Program Interfaces (APIs).

In an embodiment of the present invention, the received information for connecting to the one or more external systems is provided by one or more users via one or more electronic communication devices. The one or more users include, but not limited to, testers and quality analysts. In an embodiment of the present invention, the received information for connecting to the one or more external systems is encrypted and stored as part of a user's profile. In an embodiment of the present invention, a user profile can be accessed via multiple electronic communication devices simultaneously.

At step 404, one or more test workflows are created and saved for testing the one or more external systems. Further, the one or more test workflows comprise a sequence of test steps used for accomplishing end-to-end testing. Furthermore, each test step is configured to perform a test. In addition, each test step can orchestrate data to other test steps. Also, test step execution order can be dynamically controlled based on runtime results of previous test steps of the one or more workflows. In an embodiment of the present invention, one or more test steps include various operations such as, but not limited to, File Transfer Protocol (FTP) upload and download, running windows/Unix commands, run test management tool scripts, upload test results, build Sequential Query Language (SQL) scripts and create test data files in different formats.

In an embodiment of the present invention, the one or more users create the one or more test workflows by selecting one or more pre-stored source files and corresponding one or more pre-stored target files. The one or more pre-stored source files to be tested are related to, but not limited to, databases, test management tools, servers, flat files, Extensible Markup Language (XML) data, spreadsheets, web services, Transmission Control Protocol (TCP)/Internet Protocol (IP) sockets requests, X12 files, Hypertext Transfer Protocol (HTTP) post messages and database Application Program Interfaces (APIs). In an embodiment of the present invention, the one or more pre-stored target files are one or more sample files used for comparison with one or more additional source files during testing. In an embodiment of the present invention, the one or more pre-stored target files are in the form of one or more spreadsheets.

After selecting the one or more pre-stored source and the one or more corresponding target files, the one or more users map input and output of the one or more pre-stored source files with the one or more pre-stored target files to facilitate comparison during execution of the one or more test workflows. In an embodiment of the present invention, input mapping and output mapping comprise linking various fields of the pre-stored source files and the pre-stored target files by matching criteria and corresponding expected values. Further, mapping the pre-stored source file with the pre-stored target file facilitates in testing the additional one or more source files during testing, using the saved user mappings, without scripting. Once mapping is completed, the one or more users select a location for saving execution results to complete the process of creating the one or more test workflows.

In an embodiment of the present invention, the one or more created test workflows are saved as one or more project files for future testing projects. In an embodiment of the present invention, the one or more created project files can be shared with other testers via one or more communication channels.

At step 406, the one or more external systems are connected for testing using the received information. Further, the one or more additional source files are retrieved from the one or more connected external systems for testing. At step 408, the one or more saved test workflows, corresponding to the one or more additional source files are executed for testing the retrieved one or more additional source files from the connected one or more external systems.

During test workflow execution, the user mappings corresponding to the one or more additional source files to be tested are retrieved. Further, the pre-stored mapped target file corresponding to the source file is analyzed and one or more key-value pairs are created corresponding to the pre-stored mapped target file. The key-value pairs comprise a key based on a matching criteria and corresponding expected value for each of the one or more records of the pre-stored mapped target file. In an embodiment of the present invention, the one or more key-value pairs are stored in a primary hash table. Furthermore, each record of the additional source file is then read and a key-value pair for each record of the additional source file is created. In addition, the key for each record of the additional source file is checked in the primary hash table. In case the key for a record of the additional source file exists in the primary hash table, the corresponding value from the primary hash table is retrieved and compared with the source value. If the source value is same as the target value then the test is considered as "PASS" and results of the test workflow execution are processed for forwarding to the one or more users. The results of the text execution comprise, but not limited to, number of pass tests, failed tests and missing records. In an embodiment of the present invention, the source and target files are compared using a split search algorithm.

At step 410, the test execution results related to the one or more executed test workflows are processed and provided to the one or more users in a more meaningful manner. In an embodiment of the present invention, the execution results are provided in the form of, but not limited to, reports, spreadsheets, charts, diagrams and graphs. In an embodiment of the present invention, the execution results are automatically forwarded to one or more electronic communication devices via one or more communication channels. In an embodiment of the present invention, the one or more communication channels include, but not limited to, electronic mail, Short Messaging Service (SMS), instant messaging application and web service.

Figure 5:
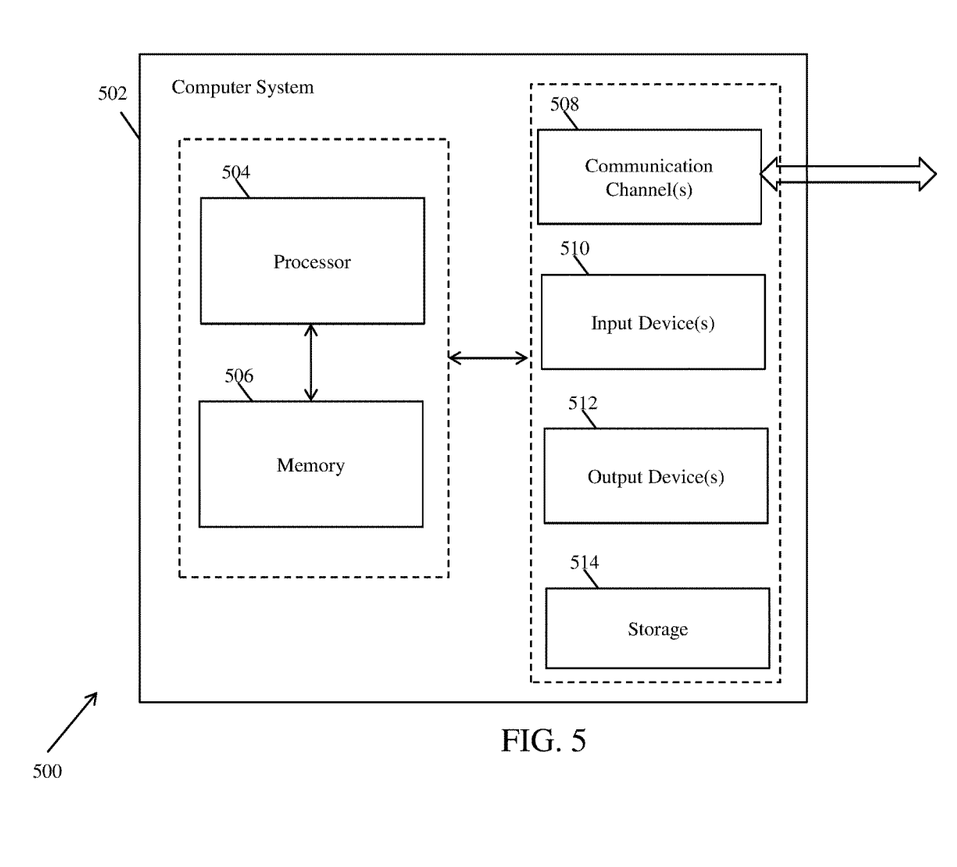
FIG. 5 illustrates an exemplary computer system for automating end-to-end testing without scripting, in accordance with an embodiment of the present invention.

FIG. 5 illustrates an exemplary computer system for automating end-to-end testing without scripting, in accordance with an embodiment of the present invention.

The computer system 502 comprises a processor 504 and a memory 506. The processor 504 executes program instructions and may be a real processor. The processor 504 may also be a virtual processor. The computer system 502 is not intended to suggest any limitation as to scope of use or functionality of described embodiments. For example, the computer system 502 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 506 may store software for implementing various embodiments of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502, and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 510 may include, but not limited to, a keyboard, mouse, pen, joystick, trackball, a voice device, a scanning device, or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In various embodiments of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

I claim:

1. A system for automating end-to-end testing, the system comprising:
    a memory storing program instructions;
    a processor for executing program instructions stored in the memory and configured to:
    receive information for connecting with one or more external systems;
    create one or more test workflows, wherein creating the one or more test workflows comprise:
        selecting one or more pre-stored source files and corresponding one or more pre-stored target files; and
        mapping input and output of each of the one or more selected pre-stored source files with the corresponding one or more selected pre-stored target files for creating one or more mapped target files;
    connect with the one or more external systems using the received information to:
    retrieve the one or more additional source files;
    compare records in the one or more additional source files with records in a first segment of the one or more mapped target files, wherein each of the mapped target files are split into multiple segments and loaded into a hash table one at a time; and
    determine unmatched records if the record or values of the records is not matched with records of each of the multiple segments of the one or more target files loaded into the hash table one at a time until a last segment of the multiple segments.

2. The system of claim 1, wherein the one or more external systems comprise one or more databases, one or more test management tools, one or more servers and components of the one or more external systems.

3. The system of claim 2, wherein the components of the one or more external systems comprise one or more flat files, Extensible Markup Language (XML) data, spreadsheets, web services, one or more Transmission Control Protocol (TCP)/Internet Protocol (IP) sockets requests, X12 files, Hypertext Transfer Protocol (HTTP) post messages and database Application Program Interfaces (APIs).

4. The system of claim 1, wherein the information for connecting with the one or more external systems comprise authentication details and connection settings.

5. The system of claim 1, wherein the information for connecting with the one or more external systems is received from one or more users.

6. The system of claim 1, wherein creating the one or more test workflows further comprise selecting a location for saving the test execution results.

7. The system of claim 1 wherein the processor is configured to automatically send the test execution results on one or more electronic communication devices via one or more communication channels.

8. The system of claim 7, wherein the one or more communication channels comprise electronic mail, Short Messaging Service (SMS), instant messaging application and web service.

9. The system of claim 1, wherein the test execution results are in the form of reports and graphical forms comprising charts, diagrams and graphs.

10. The system as claimed in claim 1, wherein the processor is configured to:
store unmatched records in relation to the first segment of the additional source files in a pending records file;
compare the unmatched records of the additional source files with records in the other multiple segments of the one or more mapped target files;
store unmatched records in relation to each of the multiple segments of the additional source files in the pending records file;
compare values of source file records with matched records of the first segment;
store records of additional source files with unmatched values in a mismatch file;
compare values of source file records with matched records of each of the multiple segments;
store records of additional source files with unmatched values in the mismatch file;
compare matched records, of the additional source files, having unmatched values with records in the other multiple segments of the one or more mapped target files; and store unmatched records in a missing record file if the record or values of the records of the additional source files is not matched
with records of each of the multiple segments of the one or more target files loaded into the hash table one at a time until a last segment of the multiple segments.

11. A computer-implemented method for automating end-to-end testing, via program instructions stored in a memory and executed by a processor, the computer-implemented method comprising:
receiving information for connecting with one or more external systems;
creating one or more test workflows, wherein creating the one or more test workflows comprise:
selecting one or more pre-stored source files and corresponding one or more pre-stored target files; and mapping input and output of each of the one or more selected pre-stored source files with the corresponding one or more selected pre-stored target files for creating one or more mapped target files;
connecting with the one or more external systems using the received information to retrieve the one or more additional source files; and
comparing records in the one or more additional source files with records in a first segment of the one or more mapped target files, wherein each of the mapped target files are split into multiple segments and loaded into a hash table one at a time; and
determining unmatched records if the record or values of the records is not matched with records of each of the multiple segments of the one or more target files loaded into the hash table one at a time until a last segment of the multiple segments.

12. The computer-implemented method of claim 11, wherein the one or more external systems comprise one or more databases, one or more test management tools, one or more servers and components of the one or more external systems.

13. The computer-implemented method of claim 12, wherein the components of the one or more external systems comprise one or more flat files, Extensible Markup Language (XML) data, spreadsheets, web services, one or more Transmission Control Protocol (TCP)/Internet Protocol (IP) sockets requests, X12 files, Hypertext Transfer Protocol (HTTP) post messages and database Application Program Interfaces (APIs).

14. The computer-implemented method of claim 11, wherein the information for connecting with the one or more external systems comprise authentication details and connection settings.

15. The computer-implemented method of claim 11, wherein the information for connecting with the one or more external systems is received from one or more users.

16. The computer-implemented method of claim 11, wherein the step of creating the one or more test workflows further comprise selecting a location for saving the test execution results.

17. The computer-implemented method of claim 11 further comprising automatically sending the test execution results on one or more electronic communication devices via one or more communication channels.

18. The computer-implemented method of claim 17, wherein the one or more communication channels comprise electronic mail, Short Messaging Service (SMS), instant messaging application and web service.

19. The computer-implemented method of claim 11, wherein the test execution results are in the form of reports and graphical forms comprising charts, diagrams and graphs.

20. A computer program product for automating end-to-end testing, the computer program product comprising: a non-transitory computer-readable medium having computer-readable program code stored thereon, the computer-readable program code comprising instructions that when executed by a processor, cause the processor to:
receive information for connecting with one or more external systems;
create one or more test workflows, wherein creating the one or more test workflows comprise: selecting one or more pre-stored source files and corresponding one or more pre-stored target files; and mapping input and output of each of the one or more selected pre-stored source files with the corresponding one or more selected pre-stored target files for testing additional one or more source files associated with the one or more external systems;

connect with the one or more external systems using the received information to retrieve the one or more additional source files;

compare records in the one or more additional source files with records in a first segment of the one or more mapped target files, wherein each of the mapped target files are split into multiple segments and loaded into a hash table one at a time; and determine unmatched records if the record or values of the records is not matched with records of each of the multiple segments of the one or more target files loaded into the hash table one at a time until a last segment of the multiple segments.

* * * * *